US008446821B2

United States Patent
Laoutaris et al.

(10) Patent No.: US 8,446,821 B2
(45) Date of Patent: May 21, 2013

(54) OFFERING INCENTIVES UNDER A FLAT RATE CHARGING SYSTEM

(75) Inventors: Nikolaos Laoutaris, Barcelona (ES); Parminder Chhabra, Barcelona (ES); Pablo Rodriguez Rodriguez, Barcelona (ES); Ravi Sundaram, Boston, MA (US)

(73) Assignee: Telefonica, S.A., Madrid (ES)

( * ) Notice: Subject to any disclaimer, the term of this patent is extended or adjusted under 35 U.S.C. 154(b) by 391 days.

(21) Appl. No.: 12/832,417

(22) Filed: Jul. 8, 2010

(65) Prior Publication Data

US 2012/0008494 A1 Jan. 12, 2012

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ...... 370/230; 370/235; 370/252; 370/395.21; 379/111; 379/112.07; 379/114.01; 379/114.1

(58) Field of Classification Search
USPC .......... 370/230, 235, 252, 395.21; 379/32.01, 379/92.03, 92.04, 111, 112.07, 114.01, 379/114.06–114.1, 121.01, 128, 133–134, 379/140, 203.01, 221.02, 221.07, 221.09, 379/112.01
See application file for complete search history.

(56) References Cited

U.S. PATENT DOCUMENTS

| | | | | |
|---|---|---|---|---|
| 5,848,139 | A * | 12/1998 | Grover | 379/114.01 |
| 7,466,657 | B1 * | 12/2008 | Van Der Wal et al. | 370/252 |
| 8,098,579 | B2 * | 1/2012 | Ray et al. | 370/230 |
| 2004/0083112 | A1 * | 4/2004 | Horst | 705/1 |
| 2006/0030291 | A1 * | 2/2006 | Dawson et al. | 455/405 |
| 2012/0008494 | A1 * | 1/2012 | Laoutaris et al. | 370/230 |

OTHER PUBLICATIONS

"Delay tolerant bulk data transfers on the internet"; Laoutaris et al.; SIGMETRICS '09 Proceedings of the eleventh international joint conference on Measurement and modeling of computer systems pp. 229-238; Jun. 15-18, 2009; ISBN: 978-1-60558-511-6.*
"Algorithms for Constrained Bulk-Transfer of Delay Tolerant Data"; Chhabra et al.; 2010 IEEE International Conference on Communications (ICC); 2010; ISBN 978-1-4244-6404-3.*

* cited by examiner

*Primary Examiner* — Michael Thier
*Assistant Examiner* — Benjamin H Elliott, IV
(74) *Attorney, Agent, or Firm* — Katten Muchin Rosenman LLP

(57) ABSTRACT

The invention describes a method of providing incentives to users via supporting mechanisms and algorithms for facilitating the move of DT traffic to off-peak hours. It proposes an efficient utilization of the network resources during peak hour under a flat-rate pricing scheme with the cooperation and blessing of the users and without adding complexity to billing.

2 Claims, 5 Drawing Sheets

OFFERING INCENTIVES UNDER A FLAT RATE CHARGING SYSTEM

FIELD OF THE INVENTION

The present invention relates to a method of providing incentives to users to shift their delay-tolerant traffic to off-peak hours to save bandwidth and better utilize network resources.

STATE OF THE ART

Since its expansion and popularization in the early 1990s, the Internet has seen an increase in demand for Internet bandwidth. In late 1990s, web traffic was the main driver for growth of traffic. In the last few years, P2P traffic has spurred the growth of traffic on the Internet. Availability of downloadable films, IPTV, Youtube, online games, social networking platforms and applications etc. continue to drive the demand for additional bandwidth at an unpredictable pace.

Capital and operating cost of a network are defined by the peak hour load and the offered Quality of Service (QoS) during this peak hour. Therefore, ISPs are interested in efficient resource consumption during peak hour. A prime contributor to inefficient usage is caused by users exchanging "Delay Tolerant" (DT) traffic during peak hour. Upgrading capital equipment alone is an expensive and insufficient proposition. Internet service providers (ISPs) have responded to increased usage and the resulting congestion in their networks by throttling certain applications or reducing the download rate during peak hours, without the knowledge of the consumers. This has resulted in bad press for the ISPs and a huge outcry from users who demand bandwidth to drive next generation applications.

Since DT traffic by nature is tolerant to delays, it can be moved from peak-hour traffic into non-peak hours. However, given the current widely used flat-rate pricing scheme, there is no incentive for users to move their DT traffic to non-peak hours. Despite the validity of economic arguments presented in usage-based pricing models, historic examples drawn from multiple areas of economic activity indicate that commodity services like Internet access converge to simple pricing schemes, like flat-pricing, as they exist today. Network traffic at major aggregation points like DSLAMs, routing PoPs, and inter-ISP peering points follows strong di-urnal patterns. As a result, network resources are heavily strained during peak-hours and are severely under-utilized during off-peak hours. Since bandwidth is a "use it or loose it" resource, a lot of bandwidth is lost during off-peak hours owing to low utilization. While excess bandwidth cannot be moved from off-peak to peak hours, user traffic can be time-shifted, especially the DT traffic of the users.

Solutions currently used by ISPs to reduce peak-time load include:
  Throttle traffic by application (using protocol ports or deep packet inspection to identify application).
  Throttle total traffic per-user during peak-hours (defined as normal business hours). The definition of peak hour may vary from ISP to another. An ISP that mostly serves business customers experiences different peak-hour compared to an ISP that serves only residential customers.
  Reset connections sent not by end systems, but by ISPs.
  Install per month caps on traffic use [5].
There also exist non-flat rate pricing schemes for reducing the peak hour load. The following are two examples:
  Under pay-as-you-use charging schemes, ISPs propose to charge users a fixed price for upto a few giga-bytes and an additional amount for every gigabyte thereafter [9].
  Congestion based pricing [11]. Under this scheme, the users are billed in proportion to the amount of congestion they put on the network.

The above pay-as-you-use and some of the flat-rate solutions are both complex to build and maintain. Given that demand for bandwidth in a network changes over time, the above solutions, often ad-hoc, need to be constantly updated to keep up with changing user demand and new applications, and traffic is engineered differently depending on what part of the network is congested. None of the solutions from ISPs, under flat charging scheme are favourable in the market. Key reasons are: (1) throttling by application implies deploying expensive equipment to identify and rate-limit traffic, treating applications differently. (2) Throttling total traffic and applications by methods proposed above imply that protocols do not function as designed (like attempts by ISPs to throttle traffic by spoofing RESET packets to the source). (3) Only end users know what constitutes DT traffic. Rather than use automated classification tools that have a high likelihood for mis-classifying traffic as DT (Not all P2P traffic may be DT. E.g. download of security patches or short Youtube videos may not be DT). In the long run, these techniques will tend to hurt innovation since users and start-ups companies will be fearful of creating applications/services that consume a large amount of data.

On one hand, consumers want access to higher download (and upload) speeds at a flat-rate available to them during all hours. On the other hand, ISPs desire that their networks run efficiently, both at core and access links, and so, engage in traffic engineering practices. Users respond to the ISP traffic engineering practices by adopting a greedy strategy whereby they let even their DT downloads run during all hours of the day, getting whatever low rate bandwidth they can, thereby making an already bad situation worse, especially during peak hours. Only the technically savvy users put off their high volume downloads for off-peak hours when they know that they will not be subject to throttling and therefore, get a reasonable download rate.

DESCRIPTION OF THE INVENTION

This invention describes a method of providing incentives to users via supporting mechanisms and algorithms for facilitating the move of DT traffic to off-peak hours. It proposes an efficient utilization of the network resources during peak hour under a flat-rate pricing scheme with the cooperation and blessing of the users and without adding complexity to billing. If the expansion ratios are known (the volume of traffic demanded during off-peak hour compared to the volume of traffic that would be demanded by the user during peak hour) the process of calculating an amount of bandwidth to be offered by an ISP to a user in a network in exchange of moving his elastic traffic to a non-peak hour comprises the steps of:
  a. collecting the expansion ratios ($w_i$) of each user i of the network
  b. picking the users j with the smallest expansion ratio ($w_j$)
  c. making an offer to users j using the formulas $$\sum_i (E_i^o - E_i^m) \cdot I_{\{E_i^m > 0\}} \qquad (1)$$

Subject to the constraints:

$$L - \sum_i E_i^m \leq \theta \cdot C \quad (2)$$

$$\sum_i E_i^0 \leq V \quad (3)$$

d. moving traffic of users until constraints (2) and (3) are satisfied.

wherein $E_i^o$ is the ISP's offer to user i $E_i^m$ is the amount of elastic traffic moved to non-peak hour as a consequence to ISP's offer $E_i^*$ is the amount of traffic demanded by the user i to move elastic traffic $E_i$ away from the peak hour $E_i^* = w_i^* E_i$. where $w_i$ is the expansion ratio, the volume of traffic demanded during off-peak hour compared to the volume of traffic that would be demanded by the user during peak hour C is the capacity of the link.

L is the aggregate traffic load

θ is the ISP's desired link utilization as a percentage of capacity C

V is the valley of the link utilization as measured by area between the desired utilization θ and actual utilization L.

If the expansion ratios are not known, the process comprises the steps of:

a. picking a user j from an ISP database
b. offering user j to move its traffic $E_i^o$
c. if the offer is above a user's demanded expansion factor and the user accepts the ISPs offer, updating the delay tolerant traffic moved and the amount of traffic that can be accommodated during non-peak hours.
d. repeating the above steps for new users j until the equations (2) and (3) are satisfied.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DETAILED DESCRIPTION OF THE INVENTION

Figure 1:
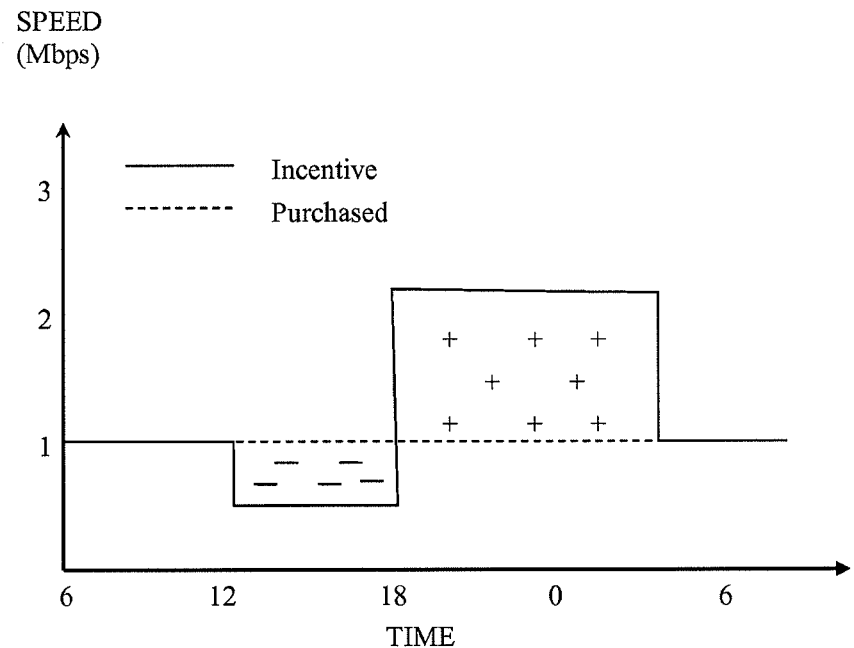
FIG. 1 is a representation of traffic depending on time, peak-time is the traffic between 12-6 PM while off-peak hours extend from 6 PM-4 AM. We want the incentives to the users to outweigh what the users have to forgo.

The invention provides a mechanism that the ISPs can use to provide users with an incentive to move their DT traffic (like P2P downloads) to off-peak hours. This is done within the realms of widely used flat-rate charging scheme for the broadband market. The key idea is that in exchange for being good citizens during peak-hours (avoiding download of DT traffic), the users are rewarded by a higher than purchased access rates by the ISP during off-peak hours. As a consequence, the users receive a higher aggregate volume of traffic download in a day compared to if they were not participating in such a scheme. FIG. 1 shows the basic idea of the proposed incentive scheme. Here, peak-time is the traffic between 12-6 PM while off-peak hours extend from 6 PM-4 AM. Note that the reward received by the user is much greater than the consequence of consuming less than purchased bandwidth during peak hours.

This scheme can be implemented in existing wifi-routers/gateways (at the end-user side) and the DSLAMs (on the network side). Additionally, this needs a user interface to get an input from the user.

The symbols used are the following:

$E_i^o$ =ISP's offer to user i.

$E_i^m$ =Amount of elastic traffic moved to non-peak hour as a consequence to ISP's offer.

$E_i^*$ =Amount of traffic demanded by the user i to move elastic traffic $E_i$ away from the peak hour.

$E_i^* = w_i^* E_i$. Here, $w_i$ is the expansion ratio. Expansion ratio for a user is the volume of traffic demanded during off-peak hour compared to the volume of traffic that would be demanded by the user during peak hour.

C=Capacity of the link.

L=Aggregate traffic load

θ=ISP's desired link utilization (as a percentage of capacity C).

V=Valley of the link utilization (as measured by area between the desired utilization θ and actual utilization L.

Figure 2:
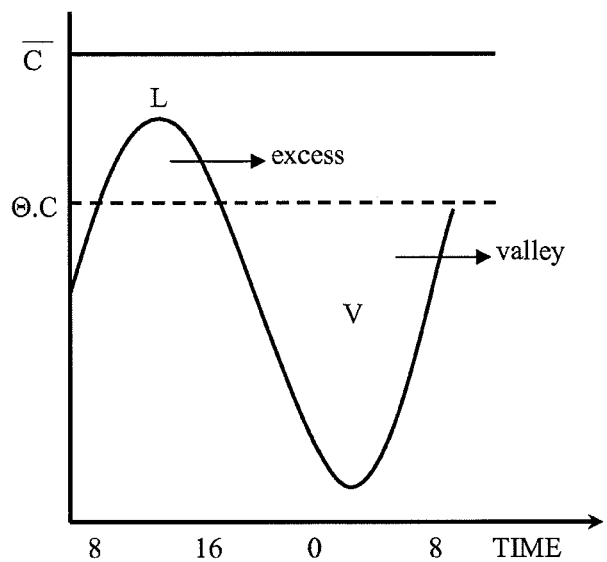
FIG. 2 represents the link utilization over the course of a day. The dashed line is the desired operating point for the ISP. The excess is the traffic that needs to be moved to the valley.

FIG. 2 shows the link utilization over the course of a day. Note the obvious di-urnal pattern. The ISP wants to run the link at θ% of the capacity C. Hence, the ISP's goal is to make bids that keep the peak hour utilization below θ.C i.e., move the excess bandwidth from the peak hours and fill it in the valley of capacity V, while minimizing the extra bandwidth spent in incentivizing the users to move their elastic traffic.

We will show two cases, the case of the Omniscient ISP, that knows the expansion ratios $w_i$ from every user and that of the Oblivious ISP, that does not have any such information. First, we will consider the case of the Omniscient ISP.

Formally, the ISP objective is to select $E_i^o$ to minimize the excess $$\sum_i (E_i^o - E_i^m) \cdot I_{\{E_i^m > 0\}} \quad (1)$$

Subject to the constraints:

$$L - \sum_i E_i^m \leq \theta \cdot C \quad (2)$$

$$\sum_i E_i^0 \leq V \quad (3)$$

Equations (2) and (3) imply that the ISP can move traffic from users as long as there is traffic above the desired threshold of θ and valley V is not full.

Case-I: Under the Omniscient model, we consider two cases: (i) omniscient fractional model and (ii) omniscient all-or-none model.

In the all or none model, the user will move $E_i^m = E_i$ if and only if $E_i^o \geq E_i^*$.

We first consider the fractional model in detail.

Figure 4:
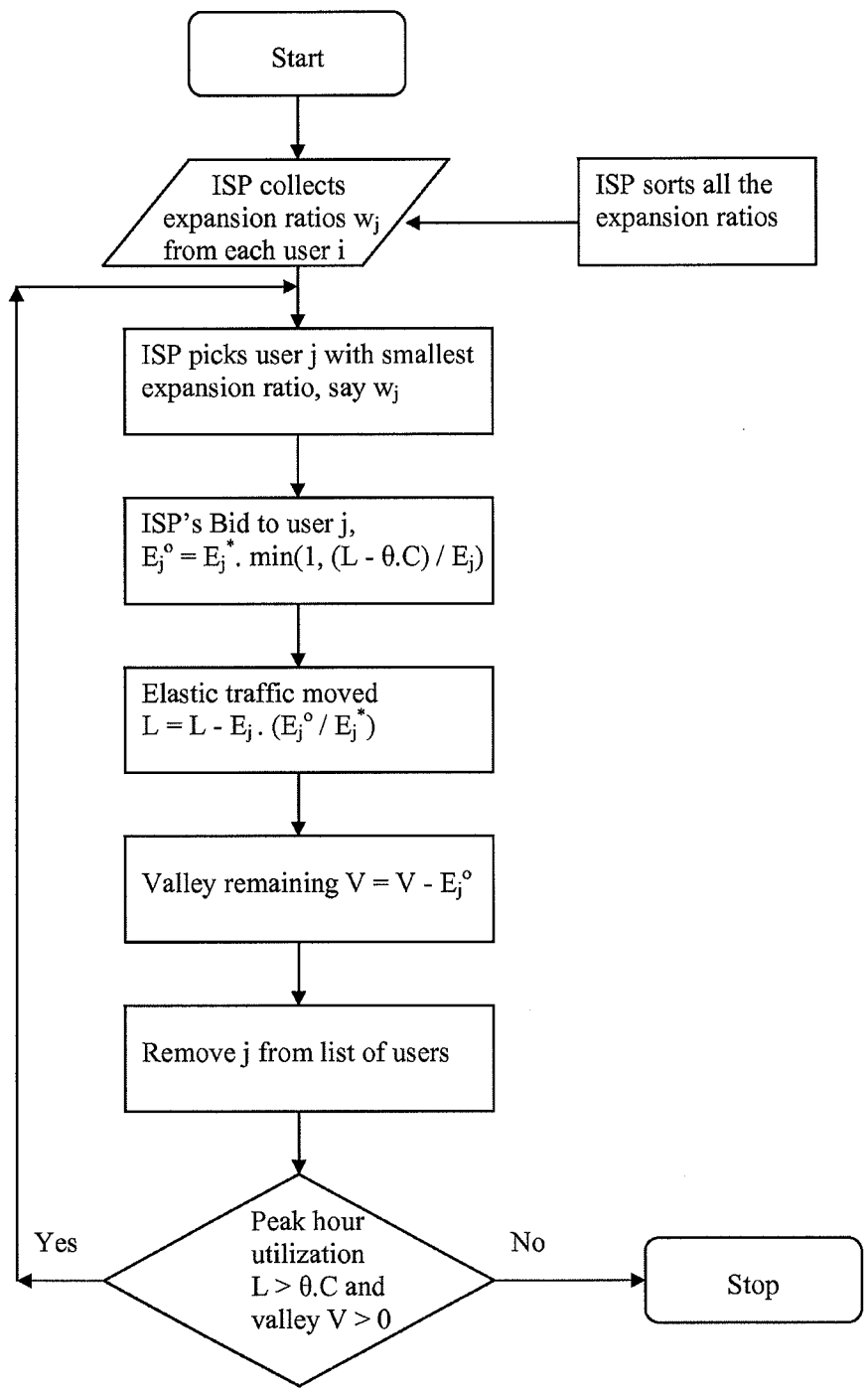
FIGS. 4-6 are flowcharts showing both the omniscient-fractional and the omniscient all-or-none algorithms.

Under the fractional model, a user will move $E_i^m = E_i \cdot \min(1, E_i^o/E_i^*)$ for any bid $E_i^* > 0$ and $E_i^o < E_i^*$ for any bid $E_i^o > 0$ offered by the ISP. Prior to the peak hour, the ISP collects bids $w_i$ (expansion ratio) from its users. The omniscient fractional model can be solved in polynomial time using a greedy algorithm. FIG. 4 describes the fractional omniscient bidding model as a flowchart. The ISP sorts the users in increasing order of their expansion ratio, $w_i$. Starting with the lowest bid for (say) a user j, the ISP moves offers to move a volume of traffic $E_j^o$. The ISP then calculates the elastic traffic moved as a consequence and the remaining volume of traffic that may be offered to the remaining users. Note that the ISP may not be in a position to move all of the traffic for a user. When moving a user's traffic, the ISP ensures that the conditions of equations 2 and 3 are satisfied. The ISP removes user j from the list of users whose traffic needs to be moved and continues with this process until it either cannot move any more traffic to the valley V or it has no more traffic to move. In doing so, by accepting bids according to the user demand $E_i$, the constraints of equations 1-3 are satisfied by the algorithm in FIG. 4.

On the ISP side, the DSLAM monitors the download traffic at the user during busy hour and ensures that the user maintains the agreed upon rate. At the end of the busy hour, the ISP reconfigures the user's transmission equipment to allow for the expanded rate during off-peak hours.

Figure 3:
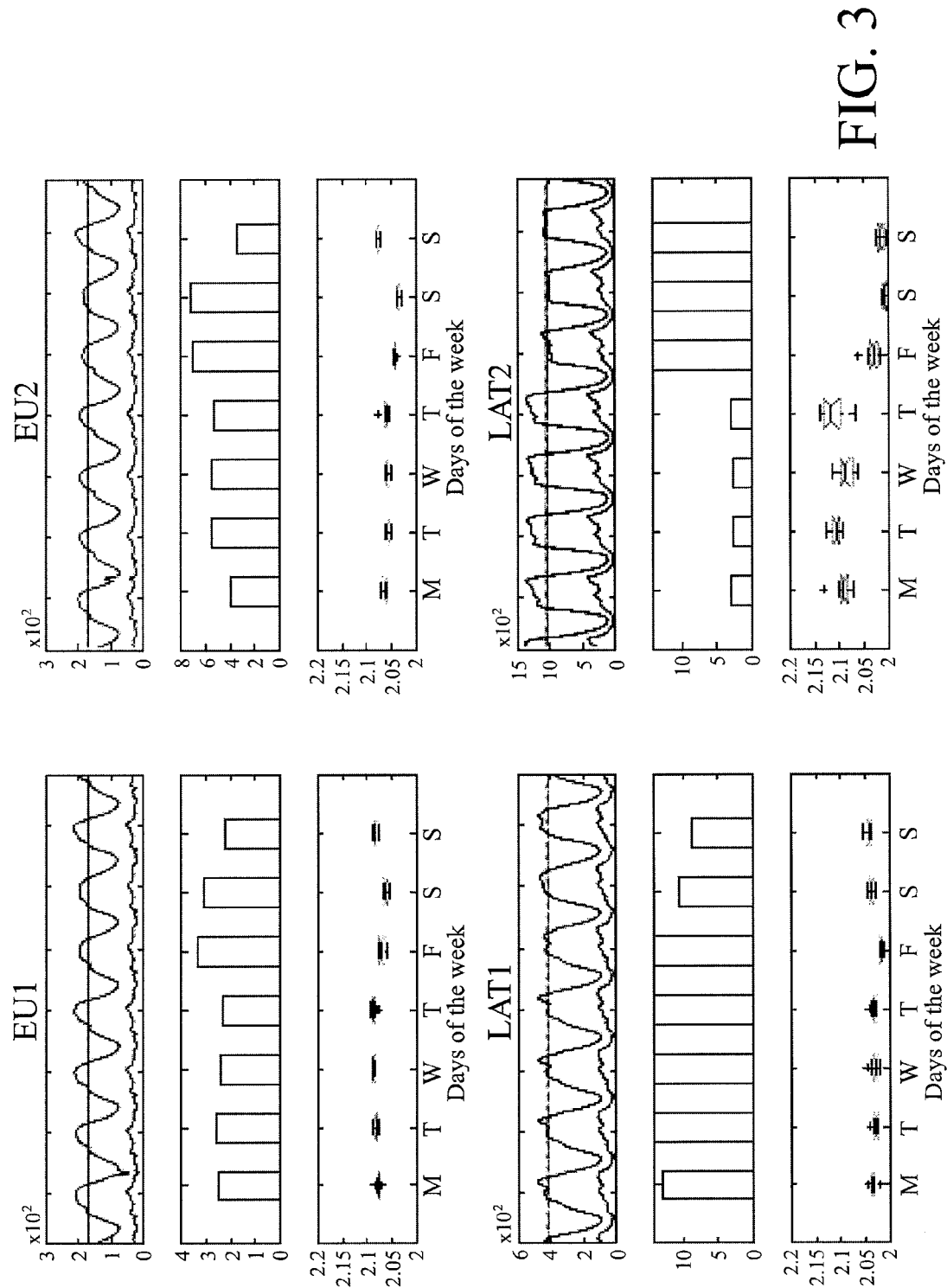
FIG. 3 shows particular examples of the invention.

FIG. 3 shows some embodiments of the invention. For each of the four customer provider links EU1, EU2, LAT1 and LAT2 we show aggregate traffic load, P2P traffic and desired operating point (at 40% of capacity) in the first row of each figure. In the middle row, we show the maximum expansion that the ISP can afford. Finally, in the bottom row, we show the actual expansion ratio via omniscient fractional bidding using a model of user greediness that is Pareto distributed with a minimum expansion of 2 and a median expansion of 5.

Figure 5:
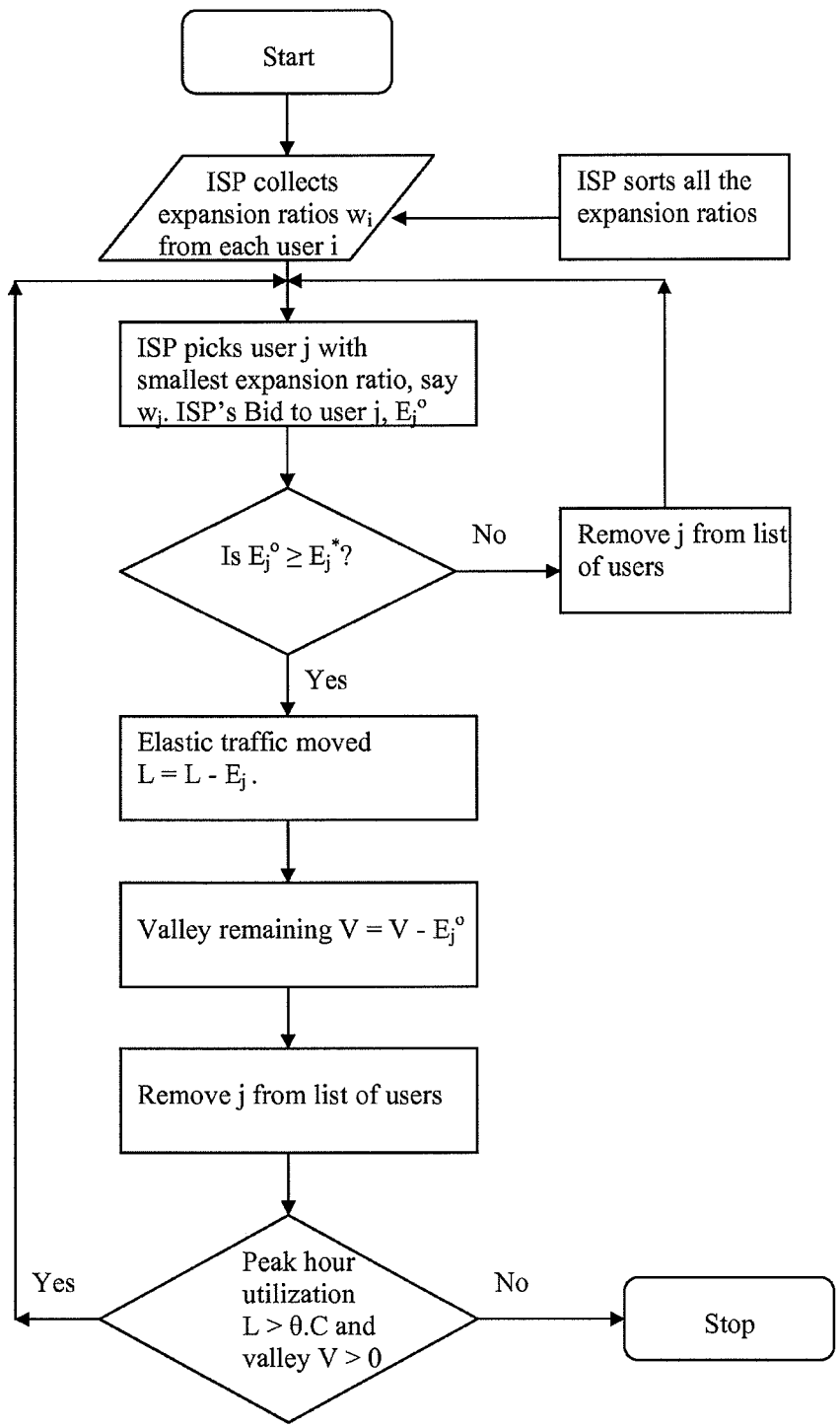

FIG. 5 shows the omniscient all-or-none algorithm as a flowchart. In this model, just as in the fractional case, the ISP collects expansion ratios $w_i$s from its customers i prior to the peak hour. As a first step, the ISP sorts all the expansion ratios received in increasing order. Until conditions of equations 2 and 3 are satisfied, the ISP (1) picks a user j with the lowest expansion ratio $w_j$ and offers to move a volume of traffic $E_j^o$. (2) If $E_j^o \geq w_j E_j (=E_j^*)$, the ISP moves all the DT traffic $E_j$ of user j, updates the amount of traffic that can be moved to non-peak hours and the amount of DT traffic moved from peak hours. Note that the ISP moves the all the traffic for user j or non at-all. (3) User j is removed from the list of users whose traffic needs to be moved.

Figure 6:
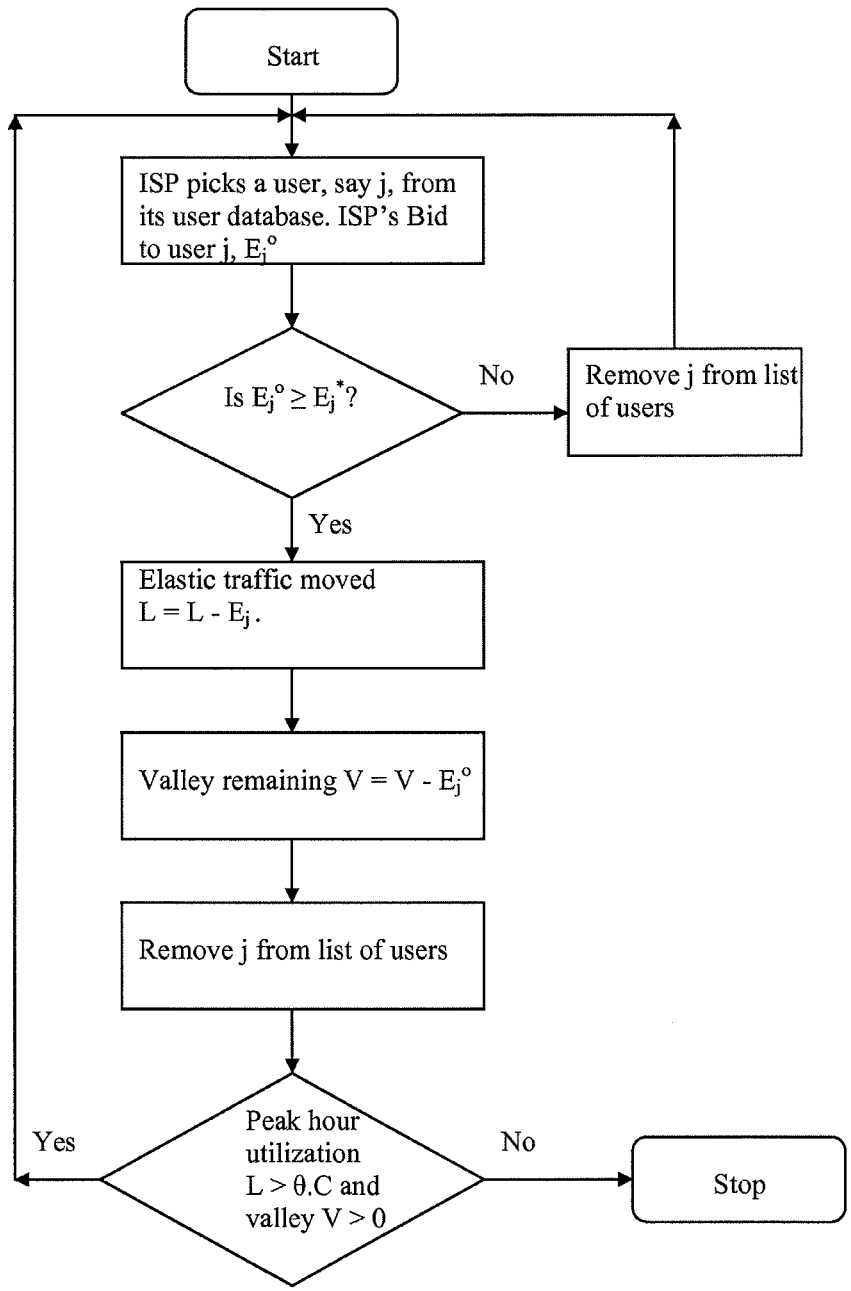

If the ISP does not have the expansion ratios that its users desire, the ISP can still move a user's DT traffic using the technique presented as a flowchart in FIG. 6. The technique consists of the following steps: (1) The ISP picks a user j from its database and offers to move traffic for user $E_j^o$. (2) If the offer is above a user's desired expansion factor, the user may agree to move the DT traffic to off-peak hours. If the offer is below what the user desires, the ISP merely moves on to the next user. (3) If the user accepts the ISP offer, the ISP updates the DT traffic moved and the amount of traffic that can be accommodated during non-peak hours. The ISP repeats the above three steps for new users j until equations (2) and (3) are satisfied, i.e., the peak hour utilization is below a desired threshold or the off-peak hours cannot accommodate any more DT traffic.

DETAILED DESCRIPTION OF A PREFERRED EMBODIMENT

We use the following algorithm:

---
Algorithm 1 Optimal fractional omniscient bidding
---

1: function $\{E_i^o\}$ = BIDDING($\{E_i\}$; $\{E_i^*\}$, $\theta$, C, L, V)

2: $\quad \{E_i^o\} \leftarrow 0_{|\{E_i^*\}|}$

3: $\quad$ while $L > \theta \cdot C$ & $V > 0$ do

4: $\quad\quad j \leftarrow \arg\min_i \left(\dfrac{E_i^*}{E_i}\right)$

5: $\quad\quad E_j^o \leftarrow E_j^* \cdot \min\left(1; \dfrac{L - C \cdot \theta}{E_j}\right) \quad$ ▷ ISP's bid to user j 6: $\quad\quad L \leftarrow L - E_j \cdot \dfrac{E_j^o}{E_j^*} \quad$ ▷ elastic traffic moved 7: $\quad\quad V \leftarrow V - E_j^o \quad$ ▷ the valley filling up 8: $\quad\quad \{E_i\} \leftarrow \{E_i\} \setminus E_j \quad$ ▷ do not consider j again 9: $\quad\quad \{E_i^*\} \leftarrow \{E_i\} \setminus E_j^*$ 10: $\quad$ end while 11: $\quad$ return $\{E_i^o\}$ 12: end function In FIG. 3, we demonstrate the application of the algorithm on four links, two in EU and two in Latin America for one week of data. To illustrate the proposal using a numerical example, we model the user expansion ratios using a Pareto distribution with $\min(w_i)=2$ and $\operatorname{avg}(w_i)=5$. The diurnal pattern is shown in the top subplot in each figure. The horizontal line is the desired threshold level at which the ISP wants to keep the link utilization. The middle subplot shows the maximum expansion ratio, the ratio of valley to excess. Note that for most links, higher expansion ratio is available during the weekends (all except in the link LAT1). The bottom subplot shows the statistical information from generating the expansion ratios several times. We observe that the minimum expansion (equation 1) achieved through optimal bidding is substantially lower than maximum expansion for most days. Our results show that ISPs can achieve desired link utilization by offering a simple incentive mechanism and by paying a traffic expansion cost that is much lower than the maximum allowed expansion. For each one of the 4 customer provider links EU1, EU2, LAT1, and LAT2: (top) aggregate traffic load and elastic part under the pessimistic model for the classification of P2P traffic; (middle) maximum expansion under $\theta=40\%$; (bottom) minimum expansion under $\theta=40\%$, omniscient fractional bidding with Pareto distributed user expansions $w_i$'s of $\min(w_i)=2$ and expectation, $E(w_i)=5$. In the omniscient-all-or-none model, the user will move $E_i^m = E_i$ iff $E_i^o \geq E_i^*$.

Flowcharts in FIGS. 4-6 show both the omniscient-fractional and the omniscient all-or-none algorithms.

In the algorithm for the oblivious ISP, the ISPs cannot make a custom offer for every user. The ISP is forced to offer a single price to all users. Users will accept an offer from the ISP only if their expansion ratio $w_i$ (unknown to the ISP) is less than what the ISP has to offer. The ISP will continue to make the offer to active users until the constraint equations (2) and (3) are satisfied. Clearly, on an average, the number of users that the ISP has to ask is much higher than in the omniscient case since the users may reject the ISP's offer if the offered expansion ratio of the ISP is less than the individual's required expansion ratio to move the elastic traffic to non-peak hours.

The invention provides the following advantages:

The proposed solution maintains a flat-rate charging scheme, a benefit, both for the ISP and the consumer for its simplicity of billing.

An incentive scheme both for the benefit of the consumers and the ISPs. A key benefit for the ISP is that it helps reduce the peak-hour traffic volume. A corresponding benefit for the consumers is that they get rewarded with a higher aggregate download volume for moving their DT traffic to off-peak hours. Further, consumers get to decide what traffic is tolerant to delays.

A custom solution for every consumer, without having to upgrade links with minimal intervention from each customer.

All the complexity of changing download rates for users who participate in this scheme rests with the ISP and with minimal intervention from the user. The only thing that is required from the consumer is setting the desired expansion ratio $w_i$ to indicate how much off-peak bandwidth is demanded for a reduction in peak hour consumption.

The ISP can implement this solution at the wifi-routers and the DSLAMs with minimal cost and no additional hardware.

The scheme is non-intrusive. It avoids the use of expensive DPI equipment and does not violate Net Neutrality, a principle applied to all residential broadband customers.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiments described herein, but also encompasses any variations that may be considered by any person skilled in the art, within the general scope of the invention as defined in the claims.

The invention claimed is:

1. A method of calculating an offer of an amount of bandwidth by an internet service provider to a selected user in a network in exchange for moving an elastic traffic of the selected user to a non-peak hour, the method comprising the steps of:
    a. collecting respective expansion ratios ($w_i$) for all users i of the network;
    b. picking users j from all users i, each user j having an expansion ratio ($w_j$) which is a smallest expansion ratio ($w_i$) of all the expansion ratios ($w_i$);
    c. making an offer to users j using a formula $$\sum_i (E_i^o - E_i^m) \cdot I_{\{E_i^m > 0\}} \quad (1)$$

subject to constraints $$L - \sum_i E_i^m \leq \theta \cdot C \quad (2)$$

$$\sum_i E_i^o \leq V \quad (3)$$

d. moving traffic of users j until constraints (2) and (3) are satisfied;
wherein
    $E_i^o$ is an offer to all users i,
    $E_i^m$ is the amount of elastic traffic moved to a non-peak hour as a consequence of the offer to all users i,
    C is the capacity of the link,
    L is the aggregate traffic load,
    $\theta$ is a desired link utilization of the internet service provider as a percentage of capacity C, and
    V is the valley of a link utilization as measured by an area between the desired utilization $\theta$ and the aggregate traffic load L.

2. A method of calculating an offer of an amount of bandwidth by an internet service provider to a selected user in a network in exchange for moving an elastic traffic of the selected user to a non-peak hour, the method comprising the steps of:
    a. picking a user j from database of users of the internet service provider;
    b. making an offer to user j to move traffic $E_j^o$ of user j;
    c. if the offer is above a desired expansion factor and user j accepts the offer, moving a delay tolerant traffic and updating an amount of traffic that can be accommodated during non-peak hours;
    d. repeating the steps a-c for new users j until the following equations are satisfied $$L - \sum_i E_i^m \leq \theta \cdot C \quad (2)$$

$$\sum_i E_i^o \leq V \quad (3)$$

wherein
    $E_i^o$ is the offer to a user i,
    $E_i^m$ is an amount of elastic traffic moved to non-peak hour as a consequence to the offer,
    C is the capacity of a link,
    L is the aggregate traffic load,
    $\theta$ desired link utilization as a percentage of capacity C, and
    V is the valley of a link utilization as measured by an area between the desired utilization $\theta$ and the aggregate traffic load L.

* * * * *